United States Patent [19]
Kobayashi et al.

[11] Patent Number: 5,758,928
[45] Date of Patent: Jun. 2, 1998

[54] BRAKE SYSTEM FOR VEHICLE

[75] Inventors: Naoki Kobayashi; Yoshifumi Shibusawa, both of Nagano-ken; Kanau Iwashita; Hidetoshi Toyoda, both of Saitama, all of Japan

[73] Assignees: Nissin Kogyo Co., Ltd., Ueda; Honda Giken Kogyo Kabushiki Kaisha, Tokyo, both of Japan

[21] Appl. No.: 716,934

[22] Filed: Sep. 20, 1996

[30] Foreign Application Priority Data

Jan. 30, 1996 [JP] Japan ................... 8-014300

[51] Int. Cl.⁶ ........................................... B60T 13/74
[52] U.S. Cl. ........................... 303/2; 188/72.2; 188/346
[58] Field of Search ...................... 303/2, 90, 116.2, 303/10; 188/72.2, 346, 344

[56] References Cited

U.S. PATENT DOCUMENTS 5,183,317  2/1993  Gutzeit ..................... 303/116.2 X
5,417,482  5/1995  Kashima et al. ............ 303/72.2 X

FOREIGN PATENT DOCUMENTS

451555 A1  10/1991  European Pat. Off. .......... 188/346
5-330478  12/1993  Japan.

*Primary Examiner*—Lee W. Young
*Attorney, Agent, or Firm*—Armstrong, Westerman, Hattori, McLeland & Naughton

[57] ABSTRACT

An orifice and a one-way valve for permitting a flow of a liquid only in one direction from a primary master cylinder to an input port in a secondary master cylinder of a brake system are incorporated in parallel in an hydraulic pressure introduction passageway which connects the input port in the secondary master cylinder and an output port in the primary master cylinder. Thus, it is possible to moderate a kick-back phenomenon due to a back-flow of a pressure oil from a hydraulic pressure chamber in the secondary master cylinder via the input port toward the primary master cylinder, and to rapidly fill a brake oil in the secondary master cylinder from the side of the primary master cylinder.

8 Claims, 5 Drawing Sheets

1

BRAKE SYSTEM FOR VEHICLE

BACKGROUND OF THE INVENTION

1. Field of the Invention

The present invention relates to a brake system for a vehicle, comprising: a primary master cylinder operated by a brake operating element; a wheel brake cylinder operated by an output hydraulic pressure from the primary master cylinder for braking a wheel; and a secondary master cylinder operated by a reaction force to the operation of the wheel brake cylinder, in which an output hydraulic pressure from the secondary master cylinder is supplied to the wheel brake cylinder or another wheel brake cylinder, the secondary master cylinder including an input port for introducing the output hydraulic pressure from the primary master cylinder through a hydraulic pressure introduction passageway, and a valve means which puts the input port into communication with a hydraulic pressure chamber in the secondary master cylinder in a substantially inoperative state of the secondary master cylinder, but which cuts off the communication in an operative state of the secondary master cylinder, the hydraulic pressure introduction passageway having an orifice incorporated therein.

2. Description of the Related Art

Such a brake system is already known, as disclosed, for example, in Japanese Patent Application Laid-open No. 5-330478.

In such known brake system, when the piston in the secondary master cylinder is advanced by the reaction force to the wheel brake cylinder, the orifice provided in the hydraulic pressure introduction passageway serves to moderate the back-flow of the pressure oil in the hydraulic pressure chamber through the input port toward the primary master cylinder to prevent or moderate a kick-back phenomenon, until the communication between the input port in the secondary master cylinder and the hydraulic pressure chamber is cut off.

When a brake oil is filled in the brake system, the orifice resists the flow of the brake oil toward the secondary master cylinder and thus, is an obstacle to the rapid filling. Therefore, in the known system, a manual valve is provided in the hydraulic pressure introduction passageway so as to be able to make a bypass detouring the orifice, so that in filling the brake oil, the manual valve is opened to insure a smooth flow of the brake oil, and after the filling, the manual valve is closed, as disclosed in the above-described patent specification.

However, it is troublesome to open and close the manual valve every time when the brake oil is filled. If an operator forgets to close the manual valve after the filling of the brake oil, the function of the orifice is not exhibited and hence, it is necessary to re-inspect the manual valve, and much labor is required.

SUMMARY OF THE INVENTION

Accordingly, it is an object of the present invention to provide a brake system of the above-described type, wherein the brake oil can swiftly be filled, and even during such filling of the brake oil, it is possible, without incorporating any special operation, to secure the smooth flow of the brake oil toward the secondary master cylinder without being interfered by the orifice.

To achieve the above object, according to the present invention, there is provided a brake system for a vehicle, comprising: a primary master cylinder operated by a brake operating element; a wheel brake cylinder operated by an output hydraulic pressure from the primary master cylinder for braking a wheel; and a secondary master cylinder operated by a reaction force to the operation of the wheel brake cylinder, in which an output hydraulic pressure from the secondary master cylinder is supplied to the wheel brake cylinder or another wheel brake cylinder, the secondary master cylinder including an input port for introducing the output hydraulic pressure from the primary master cylinder through a hydraulic pressure introduction passageway, and a valve means which puts the input port into communication with a hydraulic pressure chamber in the secondary master cylinder in a substantially inoperative state of the secondary master cylinder, but which cuts off the communication in an operative state of the secondary master cylinder, the hydraulic pressure introduction passageway having an orifice incorporated therein, wherein the hydraulic pressure introduction passageway is provided, in parallel to the orifice, with a one-way valve for permitting a flow of a liquid only in one direction from the primary master cylinder to the input port.

With such arrangement, the one-way valve is incorporated in the hydraulic pressure introduction passageway in parallel to the orifice for permitting a flow of a liquid only in one direction from the primary master cylinder to the input port. Therefore, in filling a brake oil from the side of the first master cylinder, the one-way valve can be automatically opened to produce a smooth flow of the brake oil toward the secondary master cylinder. Thus, it is possible to rapidly fill the brake oil without addition of a special operation such as opening and closing of a manual valve, and it is possible for the orifice to reliably exhibit a kick-back attenuating function after the filling of the brake oil.

The above and other objects, features and advantages of the invention will become apparent from the following detailed description of a preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
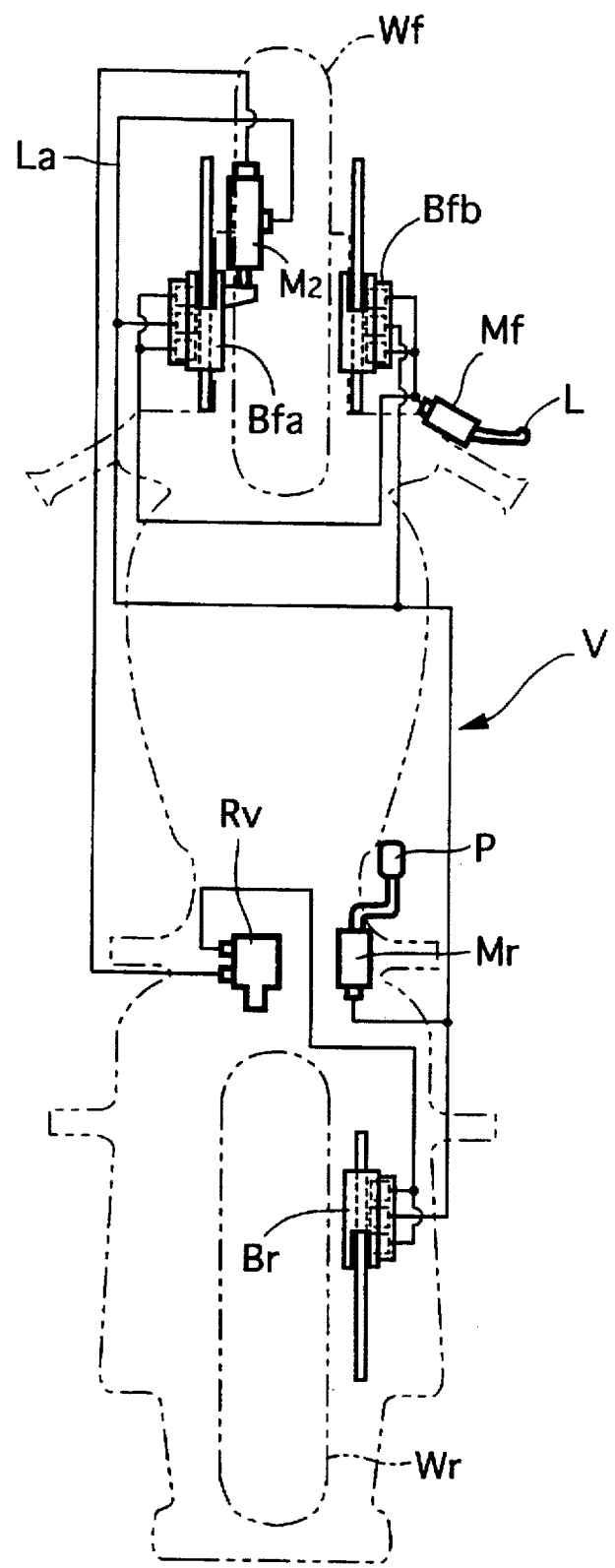
FIG. 1 is a schematic plan view of a motorcycle provided with a brake system according to an embodiment of the present invention.
Figure 2:
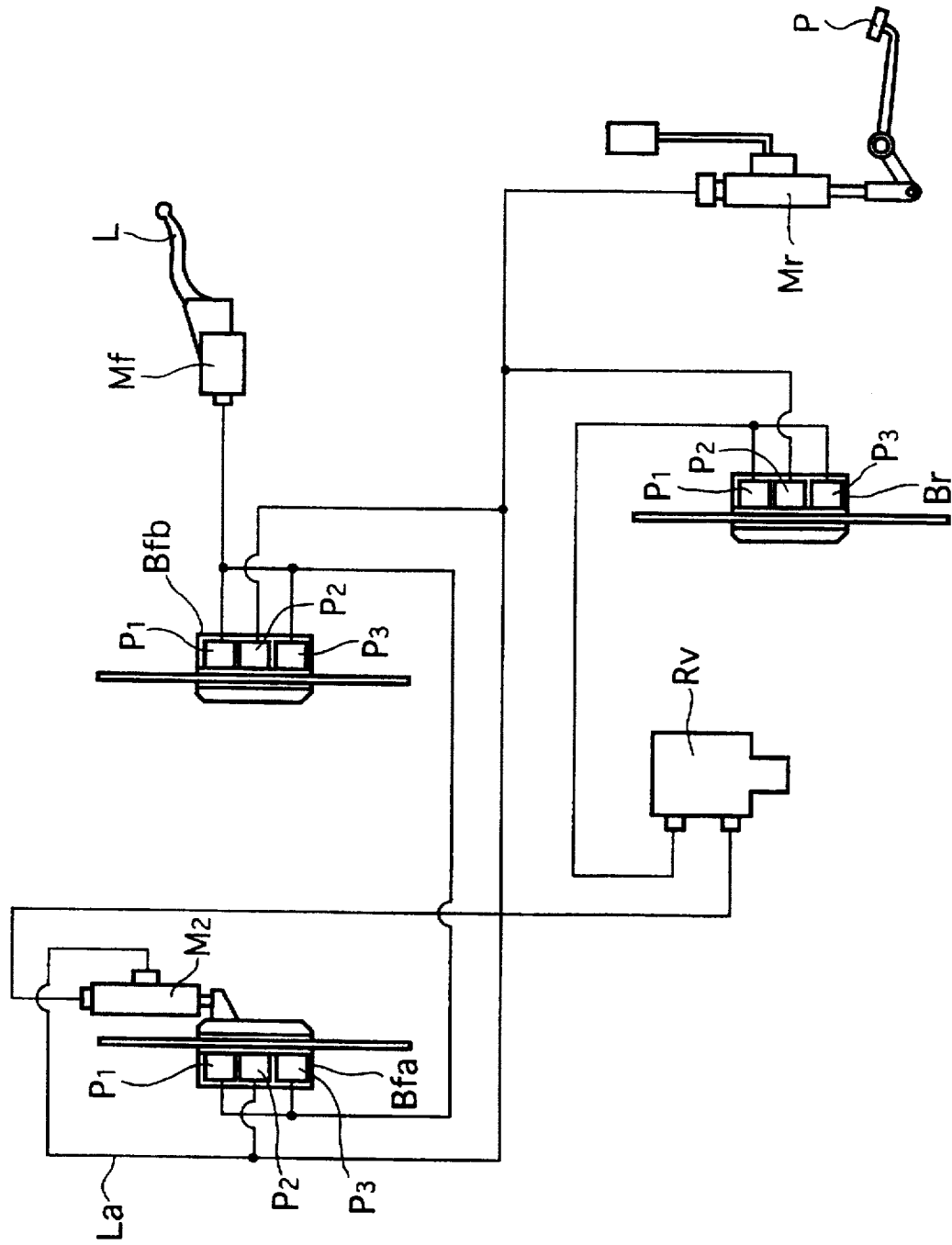
FIG. 2 is a diagrammatic illustration of a hydraulic pressure circuit of the brake system.

Referring first to FIGS. 1 and 2, a motorcycle V includes, as brake operating elements, a brake lever L pivotally supported on a steering handlebar, and a brake pedal pivotally supported on a vehicle body frame. A pair of front wheel left and right brake cylinders Bfa and Bfb for braking a front wheel Wf are mounted at a front portion of the motorcycle V. Each of the front wheel brake cylinders includes three pots, i.e., a front pot $P_1$, a central pot $P_2$ and a rear pot $P_3$. A rear brake cylinder Br for braking a rear wheel Wr is mounted at a rear portion of the motorcycle. Each of the rear wheel brake cylinders also includes three pots, i.e., a front pot $P_1$, a central pot $P_2$ and a rear pot $P_3$.

An output port of a front master cylinder Mf (a primary master cylinder) operated by the brake lever L is connected directly to the front and rear pots $P_1$ and $P_3$ in the front wheel left and right brake cylinders Bfa and Bfb. A secondary master cylinder $M_2$ is also connected to the front wheel left brake cylinder Bfa for generating a secondary hydraulic braking pressure by utilizing a braking force for the front wheel Wf. The secondary hydraulic braking pressure is supplied to the front and rear pots $P_1$ and $P_3$ in the rear wheel brake cylinder Br through a pressure-reduction control valve Rv.

On the other hand, an output port of a rear master cylinder Mr (a primary master cylinder) operated by the brake pedal P is connected directly to the central pots $P_2$ of the front wheel left and right brake cylinders Bfa and Bfb and the central pot $P_2$ of the rear wheel brake cylinder Br, and also connected to a valve chamber 20 (see FIG. 4) (which will be described hereinafter) of the secondary master cylinder $M_2$ through an auxiliary oil passage La.

Figure 3:
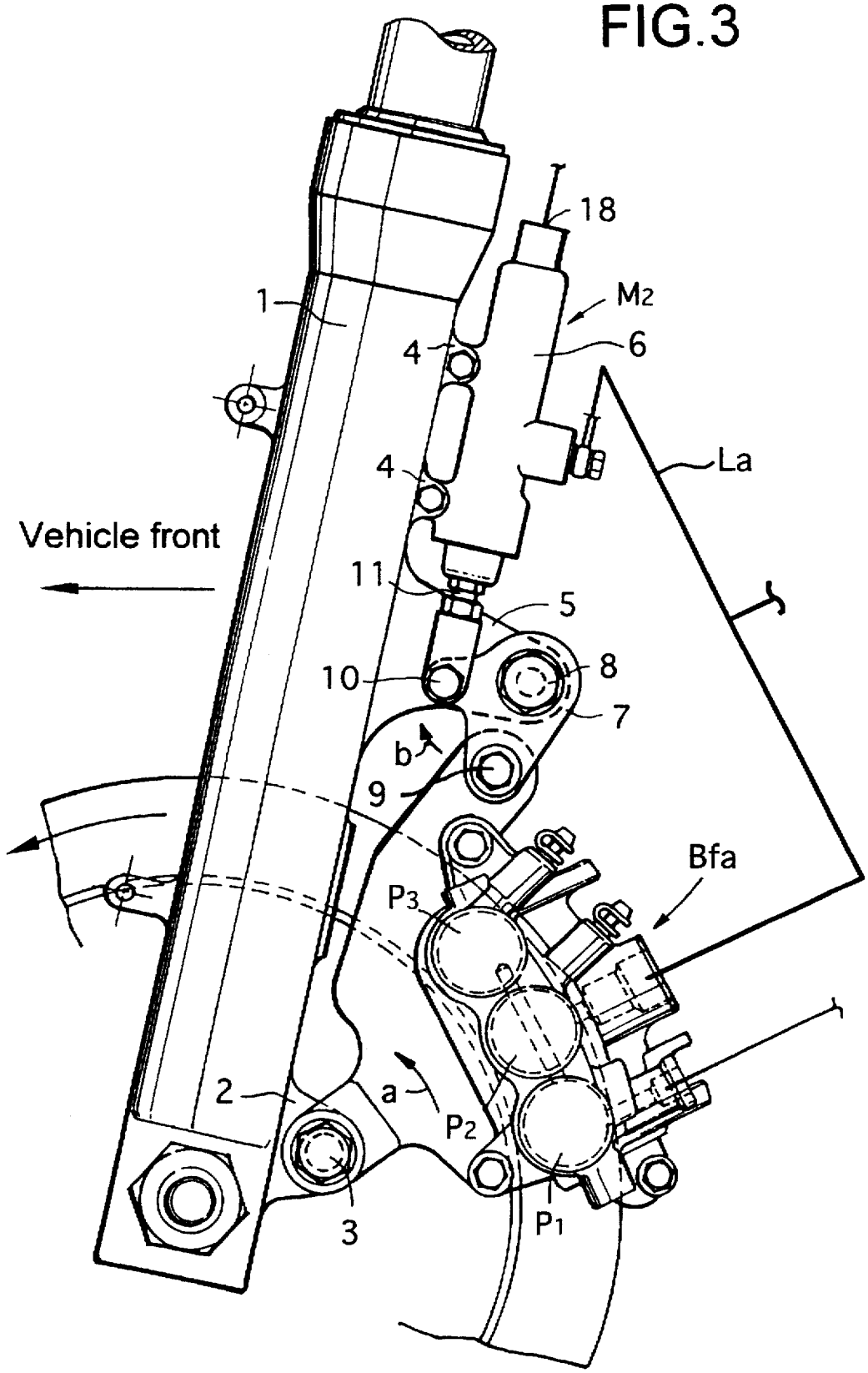
FIG. 3 is a side view of a front wheel left brake cylinder, a secondary master cylinder and a portion around them in the motorcycle.

As shown in FIG. 3, the front wheel left brake cylinder Bfa is swingably supported on a bracket 2 at a lower end of a front fork 1 of the motorcycle V by a pivot 3.

The front fork 1 is integrally provided, on a rear surface at its intermediate portion, with a pair of upper and lower small brackets 4, and a large bracket 5 located below the brackets 4. A cylinder body 6 of the secondary master cylinder $M_2$ is secured to the small brackets 4 in parallel to the front fork 1.

A bell crank 7 is swingably supported on the large bracket 5 by a pivot 8 and pivotally connected at one end thereof to an upper end of the front wheel left brake cylinder Bfa through a connecting shaft 9. The other end of the bell crank 7 is connected to an input rod 11 of the secondary master cylinder $M_2$ through a connecting shaft 10. Thus, if a braking force is applied to the front wheel Wf by the operation of the front wheel left brake cylinder Bfa, this brake cylinder Bfa is swung in the direction of an arrow a about the pivot 3 by a reaction force, and with this swinging movement, the bell crank 7 is swung in the direction of an arrow b about the pivot 8 to urge the input rod 11 upwards, thereby operating the secondary master cylinder $M_2$ to generate a secondary hydraulic braking force.

Figure 4:
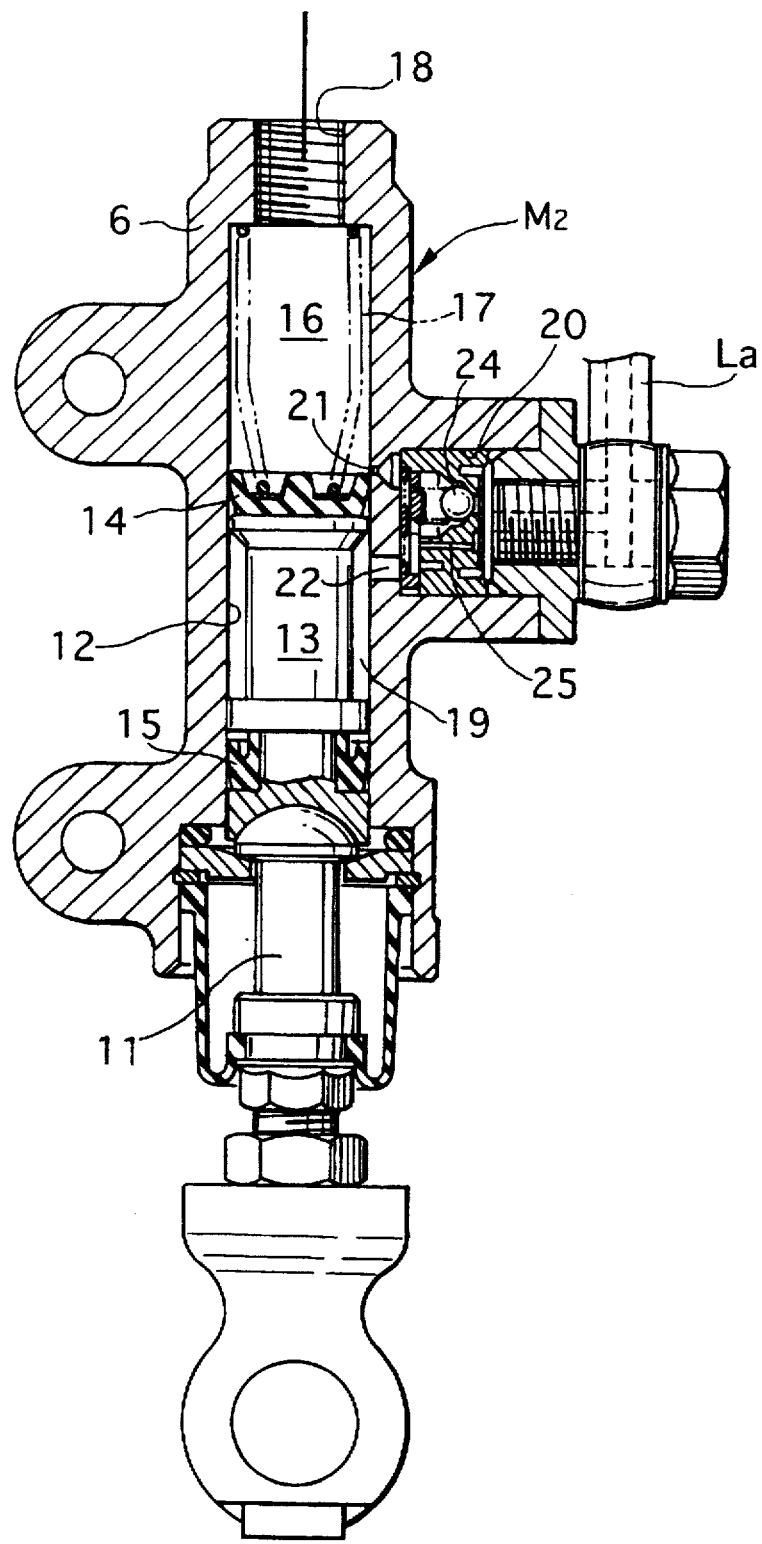
FIG. 4 is a vertical sectional side view of the secondary master cylinder.

As shown in FIG. 4, a piston 13 is slidably received in a cylinder bore 12 of the cylinder body 6 of the secondary master cylinder $M_2$. The input rod 11 is connected to a rear end, i.e., a lower end of the piston 13. A pair of front and rear cup seals 14 and 15 are mounted at an axially distance on an outer periphery of the piston 13 to come into slidable contact with an inner peripheral surface of the cylinder bore 12. A hydraulic pressure chamber 16 is defined between the front cup seal 14 and a front end wall of the cylinder bore 12, and a return spring 17 is accommodated in the chamber 16 for biasing the piston 13 in a retreating direction, i.e., downwards.

An output port 18 is provided in the cylinder bore 6 and leads to the hydraulic pressure chamber 16. The output port 18 is connected to the front and rear pots $P_1$ and $P_3$ in the rear wheel brake cylinder Br through the pressure-reduction control valve Rv.

An annular supplement oil chamber 19 is formed between both the cup seals 14 and 15 around the outer periphery of the piston 13. A valve chamber 20 is formed on one side of the cylinder body 6. When the piston 13 is located at a retreat limit, the valve chamber 20 communicates with the hydraulic pressure chamber 16 through an input port 21 immediately in front of the front cup seal 14 and also with the supplement oil chamber 19 through a supply port 22. Thus, if the cup seal 14 is advanced upwardly across an opening of the input port 21, a hydraulic pressure is generated in the hydraulic pressure chamber in response to this advancement. Therefore, the front cup seal 14 constitutes a valve means for permitting the input port 21 and the hydraulic pressure chamber 16 to be put into and out of communication with each other. If the pressure in the hydraulic pressure chamber 16 is reduced to a level lower than that in the supplement oil chamber 19 upon the retreating of the piston 13, a lip around the outer periphery of the cup seal 14 is shrunk, thereby permitting a working oil to be supplemented from the supplement oil chamber 19 through an outer periphery of a front end of the piston and the outer periphery of the front cup seal 14 into the hydraulic pressure chamber 16.

Figure 5:
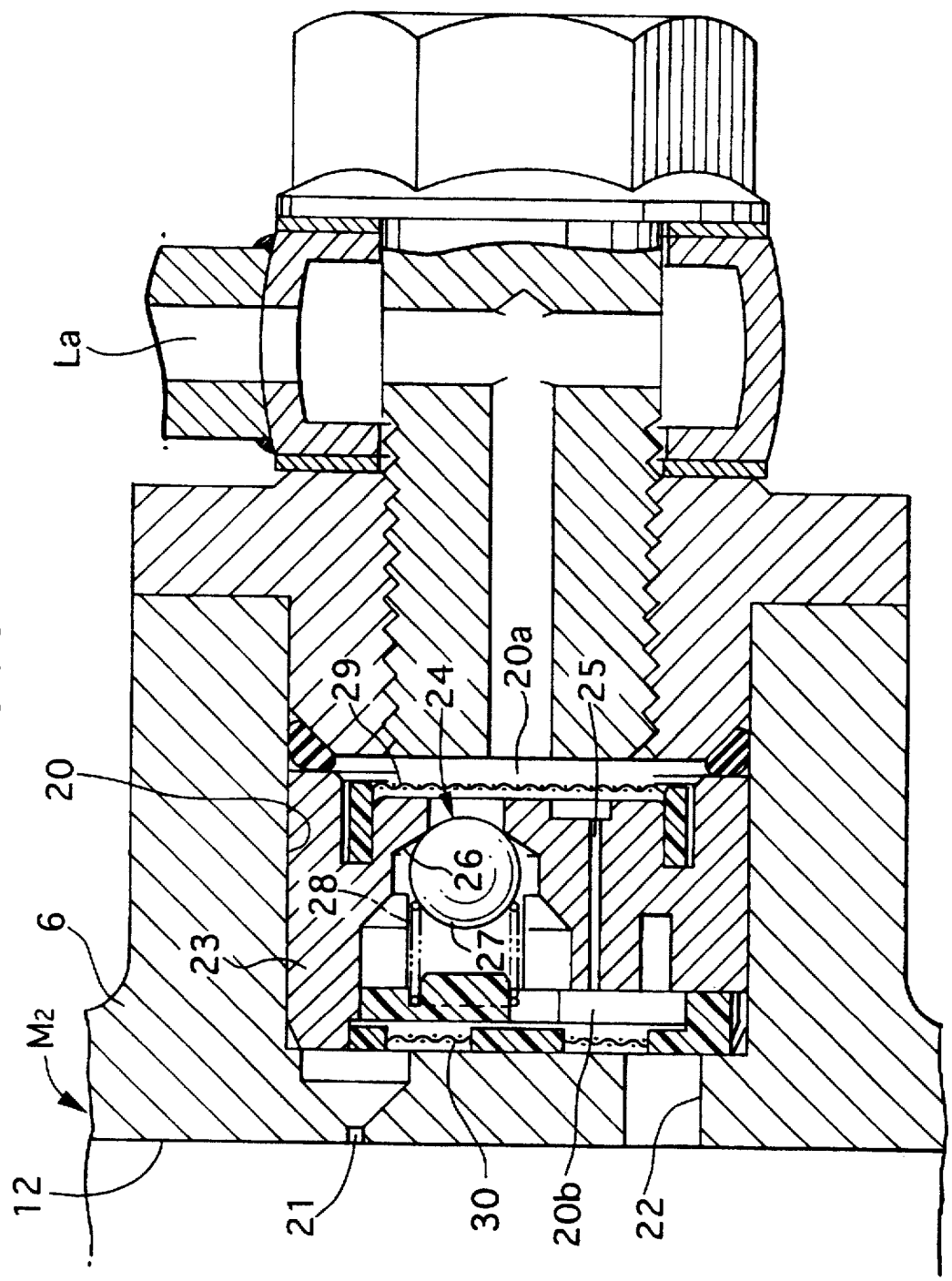
FIG. 5 is an enlarged view of an essential portion (a one-way valve and an orifice) shown in FIG. 4.

As shown in FIGS. 4 and 5, a partition wall body 23 is fitted in the valve chamber 20 for dividing the valve chamber 20 into an inlet chamber 20a adjacent the auxiliary oil passage La, and an outlet chamber 20b adjacent the input port 21 and the supply port 22. A one-way valve 24 and an orifice 25 are provided in parallel in the partition wall body 23 to permit the communication between both the chambers 20a and 20b.

The one-way valve 24 includes a valve seat 26 formed on the partition wall body 23, a valve sphere 27 cooperating with the valve seat 26 to permit the inlet and outlet chambers 20a and 20b to be put into and out of communication with each other, and a valve spring 28 for biasing the valve sphere 27 in a closing direction. Only when the pressure in the inlet chamber 20a becomes higher than that in the outlet chamber 20b, the one-way valve 24 is opened. The inlet chamber 20a and the auxiliary oil passage La constitutes a hydraulic pressure introduction passageway for introducing the output hydraulic pressure from the rear master cylinder Mr into the input port 21.

Mesh filters 29, and 30 are mounted to opposite end faces of the partition wall body 23, so that a foreign body is prevented from entering the one-way valve 24 and the orifice 25.

The operation of this embodiment will be described below.

When the front master cylinder Mf is operated by the brake pedal L, the hydraulic braking pressure output from the front master cylinder Mf is supplied to the front and rear pots $P_1$ and $P_2$ in the front wheel left and right brake cylinders Bfa and Bfb to brake the front wheel Wf. With this braking, the front wheel left brake cylinder Bfa is swung in the direction of the arrow a in FIG. 3. This causes the input rod 11 of the secondary master cylinder $M_2$ to be forced upwardly through the bell crank 7, thereby advancing the piston 13. Then, the front cup seal 14 is moved upwards across the opening of the input port 21 and thereafter, a secondary hydraulic braking pressure is developed in the hydraulic pressure chamber 16 in accordance with the amount of piston 13 advanced. This secondary hydraulic braking pressure is supplied into the front and rear pots $P_1$ and $P_2$ in the rear wheel brake cylinder Br through the pressure-reduction control valve Rv. At that time, the pressure-reduction control valve Rv moderately reduces the hydraulic pressure output thereto and outputs the resulting hydraulic pressure. Therefore, the rear wheel Wr is braked with a braking force smaller than a braking force for the front wheel Wf.

When the rear master cylinder Mr is operated by the brake pedal P in an inoperative state of the front master cylinder Mf, the hydraulic braking pressure output from the rear master cylinder Mr is supplied to the central pot $P_2$ in the rear brake cylinder Br, the central pots $P_2$ in the front wheel left and right brake cylinders Bfa and Bfb and the inlet chamber 20a in the valve chamber 20 in the secondary master cylinder $M_2$.

The hydraulic braking pressure supplied to the inlet chamber 20a pushes and opens the one-way valve 24, and is quickly passed into the outlet chamber 20b and transmitted via the inlet port 21 and the hydraulic pressure chamber 16 to the output port 18. This hydraulic braking pressure is then supplied to the front and rear pots $P_1$ and $P_3$ in the rear wheel brake cylinder Br through the pressure-reduction control valve Rv.

At that time, if the front wheel left brake cylinder Bfa is operated by the supplying of the hydraulic pressure into the central pot $P_2$ therein, the piston 13 of the secondary master cylinder $M_2$ is urged in an advancing direction by a reaction force to this operation. However, as long as this urging force is lower than the urging force applied on the piston 13 in the retreating direction by the hydraulic pressure supplied from the input port 21 to the hydraulic pressure chamber 16, the piston 13 is retained at the retreat limit.

However, when the rear master cylinder Mr is being operated, if the front master cylinder Mf is operated and the hydraulic braking pressure is supplied also to the front and rear pots $P_1$ and $P_3$ of the front wheel left brake cylinder Bfa, the reaction force to the operation of the brake cylinder Bfa is increased. And if the urging force on the piston 13 in the advancing direction becomes higher than the urging force on the piston 13 in the retreating direction, the piston 13 is started to be advanced. At that time, a portion of the pressure oil in the hydraulic pressure chamber 16 is forced through the input port 21 back toward the valve chamber 20 for a period until the front cup seal 14 is moved forwards across the input port 21. However, such pressure oil, when it flows from the outlet chamber 20b of the valve chamber 20 back to the inlet chamber 20a, is obliged to pass through the orifice 25 due to the closing of the one-way valve 24 and hence, the back-flow rate is attenuated by a constriction resistance of the orifice 25. As a result, a kick-back phenomenon to the rear master cylinder Mr can be prevented or moderated, thereby avoiding a reduction in feeling of operation of the brake pedal P.

When the cup seal 14 has been moved forwards across the input port 21, a large secondary hydraulic pressure corresponding to a large reaction force to the operation of the front wheel left brake cylinder Bfa is generated in the hydraulic pressure chamber 16 in the secondary master cylinder $M_2$, thereby increasing the braking force for the rear wheel Wr.

When the reaction force to the operation of the front wheel left brake cylinder Bfa is decreased, causing the piston 13 to be returned to the retreat limit, the input port 21 is put again into communication with the hydraulic pressure chamber 16 and hence, the pressure in the hydraulic pressure chamber 16 is replaced again by an output hydraulic pressure from the rear master cylinder Mr.

In this manner, higher one of the hydraulic braking pressure supplied from the rear master cylinder Mr into the valve chamber 20 and the secondary hydraulic braking pressure generated by the advancement of the piston 13 caused by the reaction force to the operation of the front wheel left brake cylinder Bfa is selected in the secondary master cylinder $M_2$ and is output from the output port 18.

When a brake oil is to be filled into the brake system of the motorcycle V in an assembling factory or a servicing factory, the filling is carried out from the side of the front master cylinder Mf and the rear master cylinder Mr in a condition in which bleeder caps (not shown) for the brake cylinders Bfa, Bfb and Br have been opened. In this case, that portion of the brake oil filled particularly from the rear master cylinder Mr which is force-fed via the auxiliary oil passage La into the inlet chamber 20a of the valve chamber 20, forces the one-way valve 24 to be opened, and flows smoothly into the outlet chamber 20b, wherein the flow cannot be obstructed by the orifice 25. Therefore, the force-feeding is conducted quickly, and the brake oil fed into the outlet chamber 20b is passed sequentially into the pressure-reduction control valve Rv and the rear wheel brake cylinder Br, while filling the inside of the secondary master cylinder $M_2$. In this manner, the rapid filling of the brake oil is carried out.

Although the embodiment of the present invention has been described in detail, it will be understood that the present invention is not limited to the above-described embodiment, and various modifications may be made without departing from the subject matter and scope of the invention defined in claims. For example, in a small-size motorcycle, the front wheel right brake cylinder Bfb can be omitted. In addition, the output hydraulic pressure from the secondary master cylinder $M_2$ may be also supplied to the front wheel left and right brake cylinders Bfa and Bfb. Further, the valve sphere of the one-way valve 24 may be replaced by a conical valve member or a plate-shaped valve member, and an orifice 25 may be provided in such a valve member. Yet further, the one-way valve 24 and the orifice 25 may be provided in the middle of the auxiliary oil passage La.

What is claimed is:

1. A brake system for a vehicle, comprising: a primary master cylinder operated by a brake operating element; a wheel brake cylinder operated by an output hydraulic pressure from said primary master cylinder for braking a wheel; and a secondary master cylinder operated by a reaction force to the operation of said wheel brake cylinder, in which an output hydraulic pressure from said secondary master cylinder is supplied to said wheel brake cylinder or another wheel brake cylinder, said secondary master cylinder including an input port for introducing the output hydraulic pressure from said primary master cylinder through a hydraulic pressure introduction passageway, and a valve means which puts said input port into communication with a hydraulic pressure chamber in said secondary master cylinder in a substantially inoperative state of said secondary master cylinder, but which cuts off the said communication in an operative state of said secondary master cylinder, said hydraulic pressure introduction passageway having an orifice incorporated therein, wherein said hydraulic pressure introduction passageway is provided, in parallel to said orifice, with a one-way valve for permitting a flow of a liquid only in one direction from said primary master cylinder to said input port.

2. A brake system for a vehicle according to claim 1, wherein said primary master cylinder is a front master cylinder operated by a brake lever of a motorcycle; said wheel brake cylinder for operating said secondary master cylinder by the reaction force to the operation is a front wheel brake cylinder operated by the output hydraulic pressure from said front master cylinder for braking a front wheel of the motorcycle; and said another wheel brake cylinder is a rear wheel brake cylinder for braking a rear wheel of the motorcycle.

3. A brake system for a vehicle according to claim 1, wherein said primary master cylinder is a rear master cylinder operated by a brake pedal of a motorcycle; said wheel brake cylinder for operating said secondary master cylinder by the reaction force to the operation is a front wheel brake cylinder operated by the output hydraulic pressure from said rear master cylinder for braking a front wheel of the motorcycle; and said another wheel brake cylinder operated by the output hydraulic pressure from said secondary master cylinder is a rear wheel brake cylinder for braking a rear wheel of the motorcycle.

4. A brake system for a vehicle according to claim 3, wherein said rear wheel brake cylinder is also operated by the output hydraulic pressure from said rear master cylinder.

5. A brake system for a vehicle according to claim 1, wherein said primary master cylinder comprises front and rear master cylinders which are individually operated by a brake lever and a brake pedal of the motorcycle, respectively; said wheel brake cylinder for operating said secondary master cylinder by the reaction force to the operation is a front wheel brake cylinder operated by each of the output hydraulic pressures from said front and rear master cylinders for braking a front wheel of the motorcycle; and said another wheel brake cylinder operated by the output hydraulic pressure from said secondary master cylinder is a rear brake cylinder for braking a rear wheel of the motorcycle.

6. A brake system for a vehicle according to claim 5, wherein said rear brake cylinder is also operated by each of the output hydraulic pressures from said front and rear master cylinders.

7. A brake system for a vehicle according to claim 1, wherein said secondary master cylinder includes a valve chamber which constitutes a portion of said hydraulic pressure introduction passageway, and said one-way valve and said orifice are provided in a partition wall body which is mounted in said valve chamber.

8. A brake system for a vehicle according to claim 7, wherein said partition wall body is provided with a filter for preventing a foreign body from entering said one-way valve and said orifice.

* * * * *